Patented Sept. 18, 1951

2,568,035

UNITED STATES PATENT OFFICE 2,568,035

HORTICULTURAL COMPOSITION COMPRISING DDT AND POLYETHYLENE POLYSULFIDE

William D. Stewart, Yonkers, N. Y., assignor to The B. F. Goodrich Company, New York, N. Y., a corporation of New York No Drawing. Application April 11, 1947, Serial No. 740,969

4 Claims. (Cl. 167—22)

This invention relates to horticultural spray compositions and more specifically pertains to synergistic spray adjuvants for 2,2,bis-(p-substituted aromatic) halogenated ethanes.

The 2,2,bis-(p-substituted aromatic) halogenated ethanes have been found to possess exceedingly useful insecticidal activity. One of the most important insecticidal compositions of this class of synthetic organic insecticides is 2,2,-bis-(p-chlorophenyl)-1,1,1-trichloroethane commonly known as DDT. This compound has been used to protect man from insect borne diseases by controlling such insect hosts as flies, fleas and mosquitoes; to protect animals from insectborne diseases and from the irritating effect of the bites and stings of certain insects; and to protect plants from the devastating attack of chewing, sucking and boring adult insects and their larvae. This specific aromatic chlorinated ethane's variety of uses have been accomplished by applying it in combination with finely-divided inert solid diluents for the purpose of dusting and in solution with a non-toxic solvent or in aqueous emulsions and dispersions for the purposes of spraying. For agricultural purposes, the dusts and aqueous emulsions and dispersions have been preferred.

Most insecticides are employed as dusts or aqueous emulsions or aqueous dispersions in the field. When so used they are soon removed from the plant life which they are intended to protect by the washing or leaching action of rain. In an attempt to prevent the undesirable removal of the insecticidal materials by rain, various materials have been employed as adhesives or sticking agents. The use of adhesives and sticking agents has not fully accomplished the purpose for which they were employed, for the wetting or dispersing agent present in the spray deposit because of their solubility causes the deposited materials to be redispersed in the moisture irregardless of the presence of the adhesive or sticking agent. The removal of toxicants which have little or no residual toxicity is of little consequence, but for those which have a residual toxic activity up to 6 or 8 months it is very desirable to apply them in such a manner as to achieve full benefit of their toxic ability. 2,2,bis-(p-chlorophenyl) 1,1,1-trichloroethane and its analogues are known to have considerable residual toxic activity as insecticides, but their full activity has not been completely utilized when so applied as to be subjected to repeated rains.

I have discovered a class of spray adjuvant for 2,2,bis-(p-substituted aromatic) halogenated ethanes which not only provides for simplified mixing and applying of the spray compositions but also provides a means of utilizing the residual toxic ability of this class of insecticides by forming a spray deposit which cannot be readily removed by the washing or leaching action of rain. These new spray compositions are conveniently and readily prepared by incorporating the 2,2,bis-(p-substituted aromatic) halogenated ethane into an aqueous dispersion of a polymeric organic polysulfide, especially those aqueous dispersions of polymeric organic polysulfides which are capable of forming a microscopic, translucent, discontinuous, rubbery film on drying.

The polymeric organic polysulfides which are preferred for the purposes of my invention are those which have as a general formula for the structural molecular units of [—R—$S_x$—] where R is an organic radical having no sulfur-to-sulfur linkage, and $x$ of $S_x$ has a value of from 2 to 5 or more. It is also preferred that these polymeric organic polysulfides be present in an aqueous dispersion of latex-like quality having a particle size of the polymeric polysulfide of about 1 to 10 microns and having the property of forming microscopic, translucent, discontinuous, rubbery films on drying. For the tenacity of the spray deposit of the compositions containing these polymeric organic polysulfides and the rubber-like properties of the polymer are conjoined.

The elastic properties of these polymers are regulated both by number of atoms in the organic radical, which has no sulfur-to-sulfur linkage, and by the number of sulfur atoms linked to said organic radicals. Accordingly, the larger the number of non-sulfur atoms separating the sulfur groups within the molecules, the more rubber-like are the properties of the polymer. Also the greater the number of sulfur atoms linked to the organic radicals, the more rubbery becomes the polymer. For example, the polymeric material $$[CH_2-\overset{S}{\underset{\|}{S}}-S]_n$$

is a powdery material, while $$[CH_2-\overset{S}{\underset{\|}{\overset{\|}{S}}}-S]_n$$

and $$[C_2H_4OC_2H_4-\overset{S}{\underset{\|}{S}}-S]_n$$

are rubber-like polymers.

These preferred polymeric organic polysulfides can be prepared as latex-like aqueous dispersions by the methods disclosed in my copending applications, Serial No. 599,316, filed June 13, 1945, now Patent No. 2,470,115, and Serial No. 599,317, filed June 13, 1945, now Patent No. 2,470,529, and in U. S. Patent No. 2,102,564.

Essentially, the polymeric organic polysulfides with which my invention is concerned, are prepared by condensing such water-soluble polysulfides as sodium, potassium or calcium polysulfide having from 2 to 5 or more sulfur atoms per molecule with such organic compounds as formaldehyde or those which have the graphical skeleton structural formula:

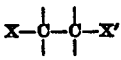

where

represents two adjacent carbon atoms, or

where

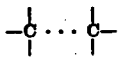

represents two carbon atoms separated by and joined to an intervening organic structure and where X and X' represents substituents which split off during the condensation polymerization process. The intervening organic structure between the pair of carbon atoms in the latter class of reactant compounds may be one of the following organic linkages: a saturated straight-chain hydrocarbon radical, a saturated branch-chain hydrocarbon radical, an unsaturated chain radical, an ether linkage, a thioether linkage, an organic radical containing an ether or a thioether linkage, an aromatic hydrocarbon linkage, as well as other organic radicals. Tri-substituted and tetra-substituted organic compounds can also be used provided that the substituents are in the nature of X and X'. The X and X' constituents which are split off by reacting with the cation of the water-soluble polysulfide reactant, can be halogen, acid sulfate, nitrate, acid phosphate, bicarbonate, formate, acetate, propionate, laurate, oleate, and others.

More specifically the organic compounds which can be employed as reactants to form the polymeric organic polysulfide condensation products are for example ethylene dichloride and dibromide, propylene dichloride and dibromide, the dichlorides and dibromides of unsaturated hydrocarbon gases derived from pressure-cracking processes and natural gas-cracking processes, the reaction products of these unsaturated hydrocarbon gases with sulfur dichloride, as well as such disubstituted compounds of which the following are examples and where X and X' have the same significance as described above:

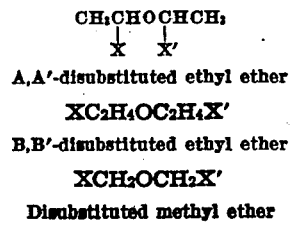

A,A'-disubstituted ethyl ether

XC₂H₄OC₂H₄X'

B,B'-disubstituted ethyl ether

XCH₂OCH₂X'

Disubstituted methyl ether

XC₂H₄OC₂H₄OC₂H₄X'

Disubstituted ethoxy ethyl ether

XCH₂SCH₂X'

Disubstituted thiomethyl ether

Disubstituted 1,3-dimethoxy-2,2-dimethyl propane

XC₃H₆OCH₂OC₃H₆X'

Disubstituted diethyl formal

Disubstituted para-diethoxy benzene

Disubstituted dimethoxy ethane

Disubstituted diethyl carbonate

Disubstituted glycol diacetate

p,p'-Disubstituted diphenyl ether

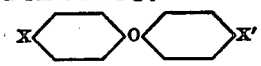

p,p'-Disubstituted dibenzyl ether

XC₂H₄SO₂C₂H₄X'

Disubstituted diethyl sulfone

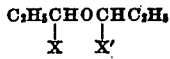

A,A'-disubstituted propyl ether

p,p'-Disubstituted benzene

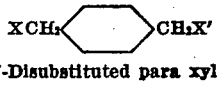

p,p'-Disubstituted para xylene

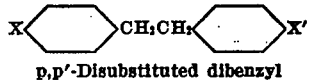

p,p'-Disubstituted dibenzyl

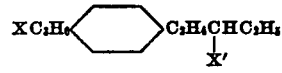

Disubstituted para hexyl benzene

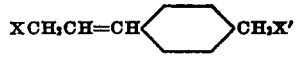

Disubstituted 3-tolyl propene-2 and others as well as compounds having more than two reactive substituents such as 1,1,2-trichloroethane, 1,2,4-trichlorobutane, 1,2,3,4-tetrachlorobutane, trichlormesitylene, and 2,2,bis-(parachlorophenyl) 1,1,1-trichloroethane and the like.

The stable latex-like aqueous dispersions having the preferred characteristics hereinbefore described can be readily prepared by carrying out the condensation reaction in the presence of an aqueous solution of a salt stable emulsifying or dispersing agent. Compounds which are suitable emulsifying or dispersing agents are lignin sulfonates, alkyl benzene sulfonates having more than 20 carbon atoms in the alkyl group, aralkyl sulfonates, sorbitan monolaurates especially those which are oil-soluble and slightly water-soluble, casein and others. From both the economical and technical standpoints, it has been found that the lignin sulfonates, especially sodium, potassium and calcium lignin sulfonates are the most satisfactory emulsifying or dispersing agents for the preparation of the previously described aqueous dispersions of polymeric organic polysulfides.

The following preparations of aqueous dispersions of specific polymeric organic polysulfides are given to illustrate the preparation of the preferred type of aqueous dispersions which are useful according to my invention. The other reactants hereinbefore enumerated can be employed in a like manner to prepare suitable spray adjuvants of the preferred type. The parts reported in the examples are by weight.

EXAMPLE I

To a mixture of an aqueous solution containing 110 parts of $(NH_4)_2S_{4.5}$ and six parts of sodium lignin sulfonate as a dispersing agent, there was added slowly with vigorous stirring 70 parts of formalin (37%) while maintaining the reaction temperature at about 30° C. by external cooling. After the addition of the formalin solution had been completed, the agitation was continued for about one hour while the temperature of the reaction mixture was maintained at about 30° C. The resulting aqueous dispersion of polymethylene polysulfide after being cooled to about room temperature, was ready for use. The aqueous dispersion of the polymeric polysulfide thus prepared had an average particle size of about 1 to 4 microns and was exceedingly stable.

EXAMPLE II

To a mixture of 480 parts of a 2-molar aqueous solution of $Na_2S_{4.5}$ and six parts of sodium lignin sulfonate as a dispersing agent there was added slowly with vigorous stirring 75 parts of ethylene dichloride while the reaction temperature was maintained at a maximum of 55° C. by external cooling. After the addition of the ethylene dichloride had been completed, the agitation was continued for about one hour while the temperature of the reaction mixture was maintained at 50 to about 55° C. The resulting aqueous dispersion had a particle size of about 1 to 4 microns, but would settle readily. The polyethylene polysulfide formed was washed three times by decantation to remove the sodium chloride formed as a by-product during the condensation. The washed polyethylene polysulfide dispersed readily to a stable latex-like dispersion.

EXAMPLE III

To a mixture of 480 parts of a 2-molar aqueous solution of $Na_2S_{4.5}$ and six parts of sodium lignin sulfonate there was slowly added with vigorous stirring 110 parts of B,B'-dichlorethyl ether while maintaining the reaction temperature at about 65° C. by external cooling. After the addition of the chlorinated ether had been completed, the agitation was continued for about one hour while the reaction temperature of the resulting mixture was maintained at about 60 to 65° C. The resulting aqueous dispersion of the polymeric organic polysulfide thus prepared had an average particle size of about 1 to 4 microns. The condensation product was washed by decantation to remove the by-product sodium chloride as in Example II. The washed product also redispersed readily.

EXAMPLE IV

To a mixture containing 150 parts of 2,2,bis-(chlorophenyl) 1,1,1-trichloroethane and 375 parts of ethylene dichloride dispersed in 200 parts of water with 80 parts of sodium lignin sulfonate, there was added slowly with vigorous stirring 2400 parts of a 2-molar aqueous solution of $Na_2S_5$. The temperature of the reaction mixture was raised from room temperature to 50° C. by the heat of the reaction. The temperature was maintained within the range of 50 to 60° C. by external cooling during the addition of the polysulfide solution and during a period of about two hours after the addition of the polysulfide solution to permit the reaction to go to completion. The reaction mixture was stirred throughout the condensation process. The resulting aqueous dispersion of the mixed polymeric organic polysulfides had a particle size ranging from 1 to 10 microns in size. The condensation product was washed 4 times by decantation to remove the sodium chloride by-product. This washed product also dispersed readily.

Each of the above prepared latex-like aqueous dispersions formed a microscopic, translucent, discontinuous, rubbery film when spread out in a thin layer and allowed to dry, and could not be redispersed even with extremely vigorous rubbing in the presence of water.

Any of the 2,2,bis-(p-substituted aromatic) halogenated ethanes can be employed with the above-described aqueous dispersions according to my invention. For example, such bis-(aromatic) substituted halogenated ethanes as 2,2,bis-(para-chlorophenyl) 1,1,1-trichloroethane, 2,2,bis-(p-anysil) 1,1,1- trichloroethane, 2,2,bis - (p - tolyl) 1,1,1-trichloroethane, 2,2,bis - (p - bromophenyl) 1,1,1-trichloroethane, 2,2,bis-(phenyl) 1,1,1-trichloroethane, 2,2,bis - (p - hydroxyphenyl) 1,1,1-trichloroethane, 2,2,bis-(p-acetoxyphenyl) 1,1,1-trichloroethane, 2,2,bis-p-chlorophenyl) 1,1,-dichloroethane, 2,2,bis-(p-fluorphenyl) 1,1,1 - trichloroethane, 2,2,bis-(p-hydroxynaphthyl) 1,1,1-trichloroethane, 2,2,bis-(p - chlorobenzophenone) 1,1,1-trichloroethane, 2,2,bis - (p - ethoxyphenyl) 1,1,1-trichloroethane, 2,2,bis(p-n-propoxyphenyl) 1,1,1-trichloroethane, 2,2,bis-(p-n-butoxyphenyl) 1,1,1-trichloroethane, 2,2,bis-(5 - hydroxy - 2,3,6-trichlorophenyl) 1,1,1-trichloroethane, 2,2,bis-(p-chlorophenoxy) 1,1,1-trichloroethane, 2,2,bis-(p-nitrophenyl) 1,1,1 - trichloroethane, 2,2,bis - (4-carboxy-3-hydroxyphenyl) 1,1,1-trichloroethane, 2,2,bis-(p - chlorobenzylsulfide) 1,1,1 - trichloroethane and the corresponding brominated compounds as well as the reaction products of 2 mols of such phenolic compounds as ortho-, meta-, and para-cresols with one mol of chloral or chloral hydrate and the reaction products of the corresponding thiophenols can be used if desired.

The above 2,2,bis-(aromatic) substituted halogenated ethanes can be incorporated with the aqueous dispersions of the polymeric organic polysulfides previously described by merely adding to the aqueous dispersion of the polymeric organic polysulfide the desired amount of the halogenated ethane toxicant in admixture with a small amount of wetting or dispersing agent.

In the following examples were a specific bis-(aromatic) substituted halogenated toxicant, 2,2,-bis-(p - chlorophenyl) 1,1,1- trichloroethane, is employed to illustrate the increased effectiveness of the compositions prepared according to my invention, the compositions were prepared in the following manner: An amount of commercially available "Wettable" 2,2,bis - (p - chlorophenyl) 1,1,1-trichloroethane comprising the toxicant in admixture with a clay extender, such as bentonite, and a small amount of a wetting agent was used which was necessary to prepare a spray composition of the concentration desired. This "wettable" toxicant was added to the aqueous dispersion of the polymeric polysulfied which had been partially diluted with stirring. The resulting mixture was then diluted to the desired volume. Where, for purposes of comparison, no polymeric organic polysulfide was employed with the toxicant, the "wettable" toxicant was added to water in the usual tank mix method in such proportions as to secure the desired concentration of the toxicant. Also in the following examples, for the sake of simplicity, 2,2,bis-(p-chlorophenyl) 1,1,1-trichloroethane is referred to as "DDT" and the concentration of "DDT" is based on the amount of actual active toxicant present in the spray composition.

EXAMPLE V

A twelve year old apple orchard containing the two varieties, Red Delicious and Rome Beauty, was selected for field tests, for these two important commercial varieties had been planted adjacent to each other and presented serious insect control problems due to lack of control in previous seasons. All spray applications were made using a power sprayer developing 550 pounds pressure. An average of 15 gallons of spray were used per tree. For each spray composition a single tree in randomized plots replicated five times was used. The data on the fruit, appearing in the following tables, were collected by periodically picking up all dropped fruits during the season and recording them according to the classifications shown. The dropped fruit records were then combined with those obtained from the harvested fruit to represent the data of seasonal performances of the spray compositions. The spray compositions which were used to control the codling moth were applied at the usual intervals throughout the growing season of from about May 22 to about August 17. The standard recognized supplements nicotine sulfate and summer oil were purposely omitted from the spray compositions to allow a more complete evaluation of the compositions used.

The weather was ideal for the most severe testing of the spray compositions, for after July 15 it was relatively dry, thus being most favorable to codling moth development and making control of this pest most difficult. The rains which did occur during this latter part of the season were heavy enough to markedly decrease existing spray deposits which lacked tenacity and thus accentuate the differences in control between spray compositions.

The degree of control of the codling moth achieved by the sprays applied is indicated in Table 1 below.

TABLE 1

*Codling moth control*

| Treatment | Per Cent Clean Fruit | Per Cent Wormy Fruit | Per Cent Stung Fruit |
|---|---|---|---|
| None (check) | 2.5 | 97.0 | 70.2 |
| 1.0 lbs. DDT per 100 gallons | 71.0 | 10.0 | 20.7 |
| 2.0 lbs. of dispersion of Example II and 1.0 lbs. DDT per 100 gallons | 81.2 | 3.5 | 16.5 |

The data in the above table indicate the superior results which can be achieved by the use of the compositions of this invention.

EXAMPLE VI

The synergistic effect of the polymeric organic polysulfides when used with bis-(p-chlorophenyl) aromatic halogenated ethanes is also illustrated in the control of fungus diseases of plants. The results of the use of 2,2,bis-(p-chlorophenyl) 1,1,1-trichloroethane alone and in combination with the aqueous dispersion of Example II is shown in the following table. These results were obtained from the same apple trees treated according to Example V.

TABLE 2

*Apple scab control*

| Treatment | Per Cent Clean Fruit | Per Cent Diseased Fruit | | |
|---|---|---|---|---|
| | | Light | Medium | Severe |
| 1.0 lb. DDT per 100 gal. Spray | 4.2 | 3.8 | 9.1 | 82.7 |
| 1.0 lb. DDT and 2.0 lbs. of dispersion of Example II | 21.6 | 20.4 | 28.4 | 29.6 |

The data in Table 2 clearly indicate that the fungicidal property of the halogenated ethane toxicant is much greater when combined with the polymeric organic polysulfide than when used alone.

It was also observed that the compositions containing both the polymeric organic polysulfide and the halogenated ethane toxicant had no deleterious effect on the foliage of the trees sprayed although the spray deposit adhered to the foliage and fruit through rainfalls as high as about two inches in less than 24 hours.

The aqueous dispersions described in Examples I, II and IV have also been employed in preparing spray compositions according to my invention and have been found to achieve results substantially equal to those described above. In fact, any of the aqueous dispersions prepared with reactants and dispersing agents hereinbefore described may be used if desired.

Although in Examples V and VI the use of a specific bis-(aromatic) substituted halogenated ethane was described, I have found that other of the 2,2,bis-(aromatic) substituted halogenated ethanes, examples of which have been hereinbefore enumerated, can be used in preparing analogous sprayable compositions. The use of spray compositions thus prepared may not achieve exactly the same results as described in Examples V and VI, but the variance will be in degree only. In general, the polymeric organic polysulfides described will have substantially the same synergistic effect on the other 2,2,bis-(aromatic) substituted halogenated ethanes as described and the use of the preferred aqueous dispersions will provide spray compositions of equal tenacity.

It will be understood that the specific concentrations of the toxicants can be varied to suit the purposes and conditions for which they are to be used. In general, the concentrations of the toxicants employed for horticultural spray purposes varies from about 0.5 pound of the toxicant to about 10 pounds of the toxicant per 100 gallons of spray. But for some specific purposes, as where the insect control need be accomplished without delay or where the insect to be controlled is exceedingly difficult to control, as much as 80 pounds of the toxicant per 100 gallons of the spray might be necessary. For the usual concentrations of the toxicants, it is generally necessary to use only about one pound to about five pounds of an aqueous dispersion of a polymeric organic polysulfide having a solids content of 50% by weight of the polymeric polysulfide and having the property of forming a microscopic, discontinuous, translucent, rubbery film on drying. For the higher concentrations of the toxicant as much as 6 to 10 pounds of the 50% aqueous dispersions having the preferred properties may be required.

Although I have disclosed specific examples of my invention, I do not thereby desire or intend to limit myself solely thereto, for, as hitherto stated, the precise proportions of the materials utilized may be varied and other materials having equivalent biological or physical properties may be employed, if desired, without departing from the spirit and scope of the invention as defined in the appended claims.

This application is a continuation-in-part of my copending application Serial No. 599,316, filed June 13, 1945, now Patent No. 2,470,115.

I claim:

1. A composition comprising from 0.5 to 10 parts by weight of a 2,2 bis-(p-substituted aromatic) halogenated ethane and from 1.0 to 5 parts by weight of polyethylene polysulfide having 3 to 5 sulfur atoms per molecular unit in the form of particles having a size no greater than 10 microns in diameter and dispersed in an aqueous solution of a lignin sulfonate.

2. A composition comprising from 0.5 to 10 parts by weight of a 2,2 bis-(p-substituted aromatic) chlorinated ethane and from 1.0 to 5 parts by weight of polyethylene polysulfide having 3 to 5 sulfur atoms per molecular unit in the form of particles having a size no greater than 1 to 4 microns in diameter dispersed in an aqueous solution of a lignin sulfonate.

3. A composition comprising from 0.5 to 10 parts by weight of a 2,2 bis-(p-halo aryl) trichlorinated ethane and from 1.0 to 5 parts by weight of polyethylene polysulfide having 3 to 5 sulfur atoms per molecular unit in the form of particles having a size no greater than 1 to 4 microns in diameter dispersed in an aqueous solution of a lignin sulfonate.

4. A composition comprising from 0.5 to 10 parts by weight of 2,2 bis-(p-chlorophenyl) trichloroethane and from 1.0 to 5 parts by weight of polyethylene polysulfide having from 3 to 5 sulfur atoms per molecular unit in the form of particles of a size no greater than 1 to 4 microns in diameter dispersed in an aqueous solution of a lignin sulfonate.

WILLIAM D. STEWART.

REFERENCES CITED

The following references are of record in the file of this patent:

UNITED STATES PATENTS

| Number | Name | Date |
|---|---|---|
| Re. 22,700 | Muller | Dec. 4, 1945 |
| 2,102,564 | Bonstein | Dec. 14, 1937 |
| 2,414,193 | Durham | Jan. 14, 1947 |
| 2,414,216 | Wean et al. | Jan. 14, 1947 |

FOREIGN PATENTS

| Number | Country | Date |
|---|---|---|
| 446,935 | Belgium | Sept. 30, 1942 |

OTHER REFERENCES

Siegler, Jour. Eco. Entom., 37, No. 1 (Feb. 1944), page 157.

Smith et al., Ind. and Engr. Chem., Apr. 1942, pp. 490–493.